US010990028B2

(12) United States Patent
Kanatani et al.

(10) Patent No.: US 10,990,028 B2
(45) Date of Patent: Apr. 27, 2021

(54) INFORMATION PROCESSING APPARATUS, IMAGE FORMING SYSTEM, INFORMATION PROCESSING METHOD, AND RECORDING MEDIUM

(71) Applicants: Yuka Kanatani, Kanagawa (JP); Keiji Kunimi, Kanagawa (JP)

(72) Inventors: Yuka Kanatani, Kanagawa (JP); Keiji Kunimi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/802,673

(22) Filed: Feb. 27, 2020

(65) Prior Publication Data

US 2020/0278618 A1 Sep. 3, 2020

(30) Foreign Application Priority Data

Feb. 28, 2019 (JP) ............................ JP2019-036787

(51) Int. Cl.

| | |
|---|---|
| ***G06F 15/00*** | (2006.01) |
| ***G06F 3/12*** | (2006.01) |
| ***G06K 1/00*** | (2006.01) |
| ***G03G 9/12*** | (2006.01) |
| ***G03G 9/09*** | (2006.01) |
| ***G03G 15/00*** | (2006.01) |

(52) U.S. Cl.

CPC ........... *G03G 9/122* (2013.01); *G03G 9/0926* (2013.01); *G03G 15/5041* (2013.01)

(58) Field of Classification Search

CPC ... G03G 9/122; G03G 9/0926; G03G 15/5041

USPC .............................. 358/1.15, 1.1, 1.14, 1.13

See application file for complete search history.

(56) References Cited

U.S. PATENT DOCUMENTS

| | | | | |
|---|---|---|---|---|
| 9,423,748 B1 | 8/2016 | Robinson et al. | | |
| 2013/0063785 A1 | 3/2013 | Miyazaki et al. | | |
| 2014/0064773 A1* | 3/2014 | Kanzawa | G03G 15/5016 | 399/81 |
| 2015/0116510 A1* | 4/2015 | Chien | G06Q 30/02 | 348/207.2 |
| 2015/0278669 A1* | 10/2015 | Akiyama | H04N 1/00244 | 358/1.14 |
| 2016/0274832 A1* | 9/2016 | Nishida | H04N 1/00204 | |

(Continued)

FOREIGN PATENT DOCUMENTS

| | | |
|---|---|---|
| EP | 2 154 578 A2 | 2/2010 |
| EP | 2 535 773 A2 | 12/2012 |

(Continued)

OTHER PUBLICATIONS

U.S. Appl. No. 16/549,102, filed Aug. 23, 2019 Keiji Kunimi, et al.

(Continued)

*Primary Examiner* — Douglas Q Tran
(74) *Attorney, Agent, or Firm* — Oblon, McClelland, Maier & Neustadt, L.L.P.

(57) ABSTRACT

An information processing apparatus includes circuitry to control a display to display a setting screen for a background pattern that allows a user to designate a special consumable material as a color to be used for information specified as the background pattern; generate print data using the designated special consumable material; and transmit the print data to an image forming apparatus.

16 Claims, 13 Drawing Sheets

(56) References Cited

U.S. PATENT DOCUMENTS

| | | | | |
|---|---|---|---|---|
| 2018/0239282 | A1 | 8/2018 | Sakai | |
| 2019/0196382 | A1* | 6/2019 | Tanaka | G03G 9/08797 |
| 2019/0286036 | A1* | 9/2019 | Minegishi | G03G 15/5091 |
| 2020/0081669 | A1* | 3/2020 | Kunimi | G03G 15/6585 |

FOREIGN PATENT DOCUMENTS

| | | |
|---|---|---|
| EP | 3 306 408 A2 | 4/2018 |
| JP | 2006-038933 | 2/2006 |
| JP | 2007-127999 | 5/2007 |
| JP | 2010-193388 | 9/2010 |

OTHER PUBLICATIONS

Extended European Search Report dated Jul. 27, 2020 in corresponding European Patent Application No. 20158988.4, 8 pages.
Office Action dated Mar. 1, 2021, in corresponding European Patent Application No. 20158988.4, citing document AO herein, 4 pages.

* cited by examiner

INFORMATION PROCESSING APPARATUS, IMAGE FORMING SYSTEM, INFORMATION PROCESSING METHOD, AND RECORDING MEDIUM

CROSS-REFERENCE TO RELATED APPLICATIONS

This patent application is based on and claims priority pursuant to 35 U.S.C. § 119(a) to Japanese Patent Application No. 2019-036787, filed on Feb. 28, 2019, in the Japan Patent Office, the entire disclosure of which is hereby incorporated by reference herein.

BACKGROUND

Technical Field

The present invention relates to an information processing apparatus, an image forming system, an information processing method, and a recording medium.

Discussion of the Background Art

There are known techniques for embedding, in image data, various types of information such as image information to be embedded in an image protected by copyright for preventing unauthorized copying and Uniform Resource Locator (URL) information to be embedded in a publicity poster.

In addition, disclosed is a technique in which invisible toner containing an infrared absorber is applied to an electrophotographic image forming apparatus to print additional information with invisible toner, which is difficult to visually recognize, on a recording medium together with a color image formed by normal color toner.

However, printing by use of a special consumable material such as invisible toner requires dedicated application software that allows a special consumable material to be designated. Thus, it is not possible to designate a special consumable material in printing with general applications such as office applications that output color specified with red (R), green (G), and blue (B).

SUMMARY

Example embodiments include an information processing apparatus including circuitry configured to: control a display to display a setting screen for a background pattern that allows a user to designate a special consumable material as a color to be used for information specified as the background pattern; generate print data using the designated special consumable material; and transmit the print data to an image forming apparatus.

Example embodiments include an information processing method including: displaying, on a display, a setting screen for a background pattern that allows a user to designate a special consumable material as a color for information specified as the background pattern; generating print data using the designated special consumable material; and transmitting the print data to an image forming apparatus.

Example embodiments include a non-transitory recording medium storing a program for controlling a computer system to carry out the above-described method.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 13A is a diagram illustrating a recording medium after printing. FIG. 13B is a diagram illustrating a recording medium as a copy of the recording medium of FIG. 13A. FIG. 13C is a diagram illustrating an image of the recording medium of FIG. 13A read by an infrared camera.

Figure 1:
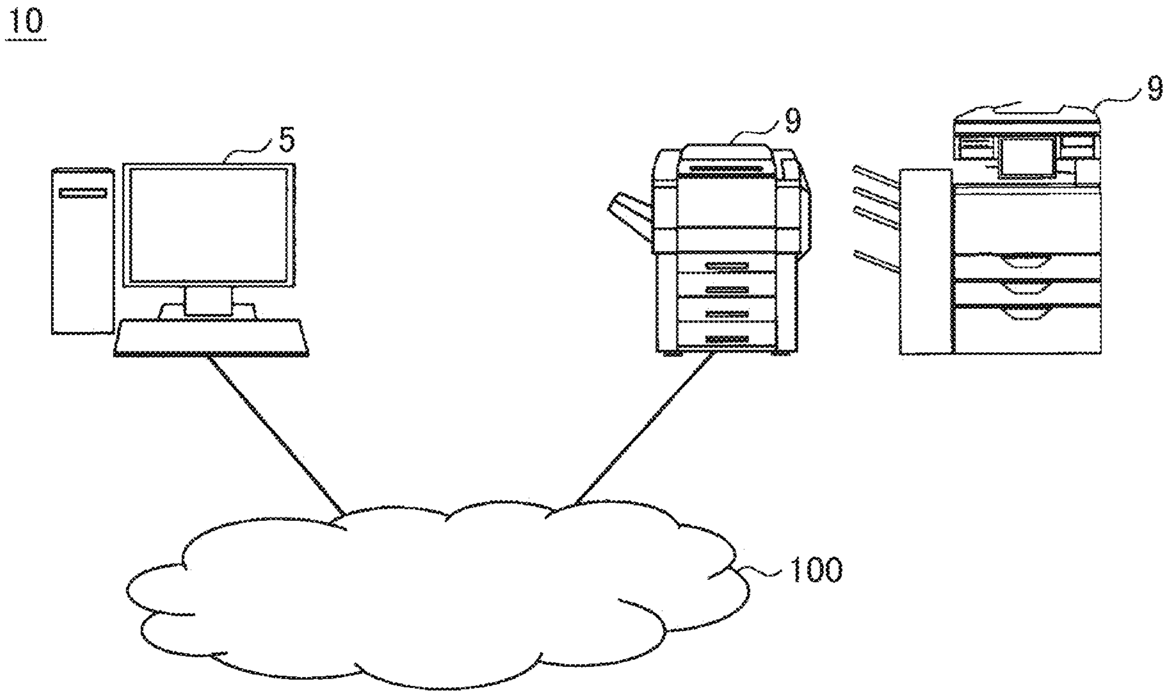
FIG. 1 is a diagram illustrating an example of a configuration of an image forming system according to an embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms “a”, “an” and “the” are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, embodiments for carrying out the invention will be described with reference to the drawings. In each of the drawings, the same components are denoted by the same reference signs, and redundant description may be omitted in some cases.

Configuration of Image Forming System

FIG. 1 is a diagram illustrating an example of a configuration of an image forming system according to an embodiment. As illustrated in FIG. 1, an image forming system 10 includes an information processing apparatus 5 and an image forming apparatus 9 that are communicably connected via a network 100 such as the Internet or a local area network (LAN). In this example, the information processing apparatus 5 and the image forming apparatus 9 may be connected with each other in any other means than the network 100. For example, the information processing apparatus 5 and the image forming apparatus 9 may be communicably connected by a cable, Near Field Communication, or the like.

The image forming apparatus 9 is a multifunction peripheral/printer/product (MFP) having a scanning function, a copying function, a printing function, a facsimile function, and the like and accommodated in a single housing. Alternatively, the image forming apparatus 9 is an electronic device having a printing function, such as a printer.

The image forming apparatus 9 according to the embodiment can perform printing by use of a special consumable material, in addition to performing color printing or monochrome printing. Here, the special consumable material refers to an invisible consumable material among consumable materials such as toner, ink, or ribbons. Specific examples of the special consumable material include infrared (IR) toner, IR ink, IR ribbons, ultraviolet (UV) toner, UV ink, or UV ribbons. Hereinafter, toner, ink, or ribbons may be referred to as "toner/ink/ribbon" in some cases.

IR toner/ink/ribbon has good absorptivity in the wavelength range of infrared light including near infrared light (approximately 850 nm), and has low absorptivity in the wavelength range of visible light (approximately 400 to 700 nm). In other words, IR toner/ink/ribbon has lower absorptivity in the wavelength range of visible light than in the wavelength range of infrared light.

IR toner/ink/ribbon is transparent (invisible) to visible light and can be read when irradiated with infrared light. Patterns such as characters and images printed with IR toner/ink/ribbon on a recording medium such as a paper sheet are invisible to human eyes, and can be read by a dedicated reading device such as an infrared camera. In addition, characters and images printed with IR toner/ink/ribbon on a recording medium cannot be copied with a general copier.

Here, the state of "invisibility" in the embodiment includes a state of being completely invisible to human eyes and a state where printed details are slightly seen but cannot be visually recognized.

UV toner/ink/ribbon has good absorptivity in the wavelength range of ultraviolet light (approximately 10 to 400 nm), and has low absorptivity in the wavelength range of visible light. UV toner/ink/ribbon is the same as IR toner/ink/ribbon described above except that UV toner/ink/ribbon has good absorptivity in the range of wavelengths shorter than visible light. Thus, redundant description will be omitted.

The following describes an example in which the image forming apparatus 9 prints an invisible pattern with IR toner. Here, IR toner is an example of a "special consumable material" and an example of an "invisible toner".

As an example, it is possible to use, as the image forming apparatus 9, a printer that can be equipped with toners of four colors of cyan, magenta, yellow, and black. In this case, the image forming apparatus 9 is equipped with IR toner instead of black toner to print an invisible pattern. In addition, the image forming apparatus 9 uses C toner, M toner, and Y toner to perform color printing.

The image forming apparatus 9 is equipped with TR toner instead of black toner. Therefore, a part to be printed in black cannot be printed with black toner. However, the image forming apparatus 9 uses toners of the three colors of cyan, magenta, and yellow to print the part to be printed in black. As an example, the image forming apparatus 9 equalizes the densities of cyan toner, magenta toner, and yellow toner to express black color. Thus, the image forming apparatus 9 can print a black color part.

The information processing apparatus 5 is a computer in which a printer driver as a program for controlling printing has been installed. The information processing apparatus 5 can execute the printer driver to display a background pattern setting screen.

Here, the background pattern refers to a pattern made of small dots and large dots printed on a recording medium so as to be embedded in the background of a print target image. Characters and figures printed as a background pattern on a recording medium are difficult to recognize even when the recording medium is visually checked. However, when the recording medium is copied, the characters and figures emerge from the copied recording medium to be visible. Therefore, the background pattern is used for forgery prevention or copy prevention. The background pattern setting screen is a user interface (UI) screen for setting, for example, the details and format of characters and figures to be printed as a background pattern on a recording medium.

The information processing apparatus 5 generates such a background pattern setting screen for display, such that IR toner can be designated as a color for information such as characters and figures to be printed as the background pattern. When IR toner is designated, it is possible to generate print data including a print target image drawn with cyan, magenta, and yellow and information to be printed as the background pattern drawn with black, and to transmit the print data to the image forming apparatus 9.

Meanwhile, the image forming apparatus 9 can print the information to be printed as the background pattern with IR toner when instructed by the information processing apparatus to perform printing with IR toner.

With such a configuration, a user can use the background pattern setting screen to generate drawing data to be printed with IR toner (hereinafter referred to as invisible data) and to set conditions for printing with IR toner.

Thus, even when using general applications such as word processors and spreadsheets that output colors specified with red (R), green (G), and blue (B), it is possible to perform printing by use of special consumable materials such as IR toner. Details of the above will be described below.

Hardware Configuration of Information Processing Apparatus

Figure 2:
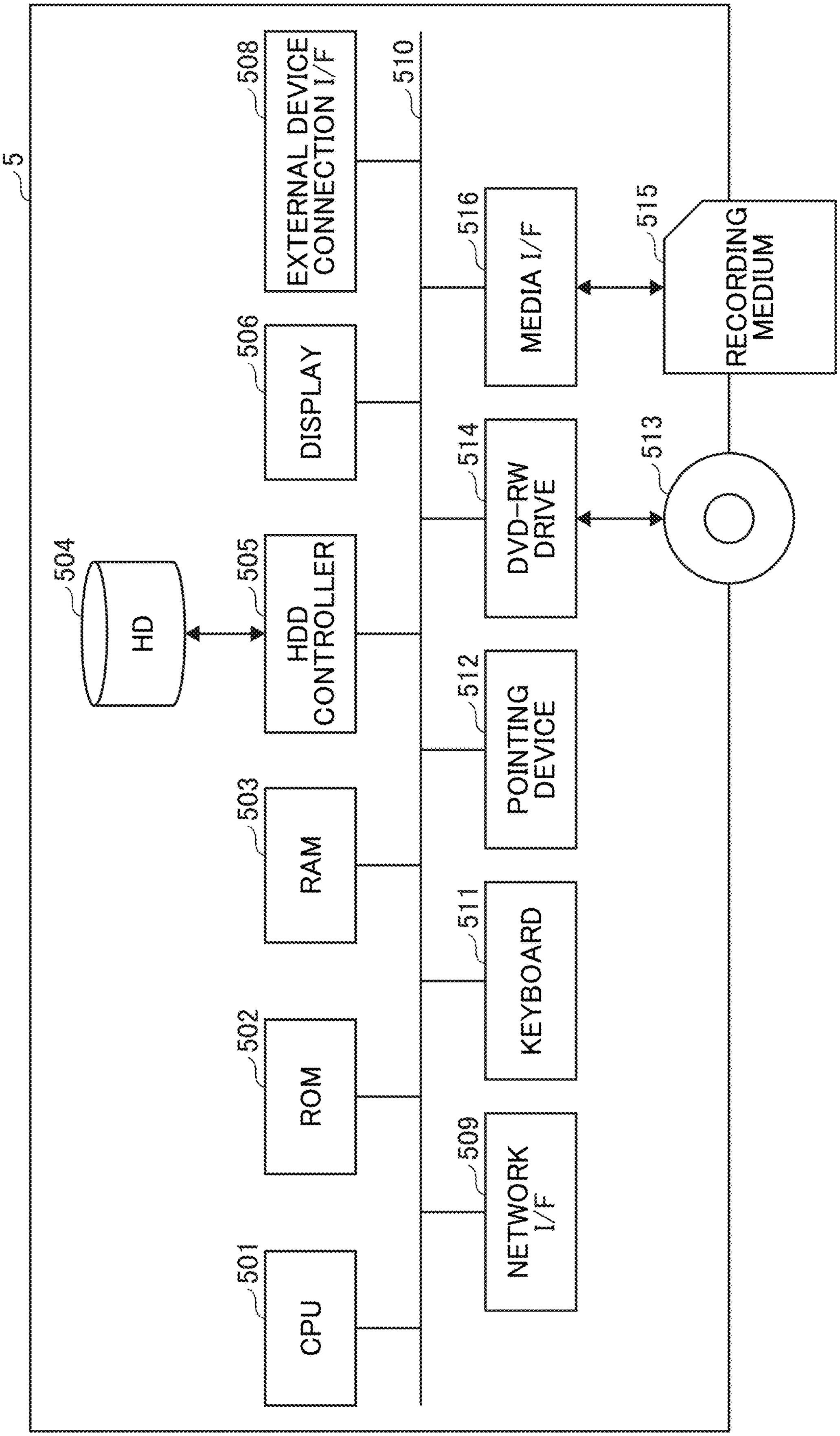
FIG. 2 is a diagram illustrating an example of a hardware configuration of an information processing apparatus according to the embodiment.

First, the hardware configuration of the information processing apparatus 5 will be described. FIG. 2 is a block diagram illustrating an example of the hardware configuration of the information processing apparatus according to the embodiment.

The information processing apparatus 5 includes a computer. As illustrated in FIG. 2, the information processing apparatus 5 includes a central processing unit (CPU) 501, a read only memory (ROM) 502, a random access memory (RAM) 503, a hard disk (HD) 504, a hard disk drive (HDD) controller 505, a display 506, and an external device connection interface (I/F) 508. The information processing apparatus 5 also includes a network I/F 509, a bus line 510, a keyboard 511, a pointing device 512, a Digital Versatile Disk Rewritable (DVD-RW) drive 514, and a media I/F 516.

Among these, the CPU 501 controls the overall operation of the information processing apparatus 5. The ROM 502 stores a program, such as an initial program loader (IPL), to be used for driving the CPU 501. The RAM 503 is used as a work area for the CPU 501. The HD 504 stores various data such as programs. The HDD controller 505 controls the reading of various data from or the writing of various data to the HD 504 under the control of the CPU 501.

The display 506 displays various types of information such as a cursor, a menu, a window, a character, and an image. The external device connection I/F 508 is an interface for connecting various external devices. The external devices in this case include a universal serial bus (USB) flash drive, a printer, and the like.

The network I/F 509 is an interface for performing data communication by use of the network 100. The bus line 510 is an address bus, a data bus, or the like for electrically connecting each component such as the CPU 501 illustrated in FIG. 2.

The keyboard 511 is a kind of input means including a plurality of keys for inputting characters, numerical values, various instructions, and the like. The pointing device 512 is a kind of input means to be used for, for example, selecting and executing various instructions, selecting an object to be processed, and moving a cursor.

The DVD-RW drive 514 controls the reading of various data from or the writing of various data to a DVD-RW 513 as an example of a removable recording medium. Note that the removable recording medium is not limited to a DVD-RW, and may be a DVD-R or the like. The media I/F 516 controls the reading of data from or the writing (storage) of data to a recording medium 515 such as a flash memory.

Hardware Configuration of Image Forming Apparatus

Figure 3:
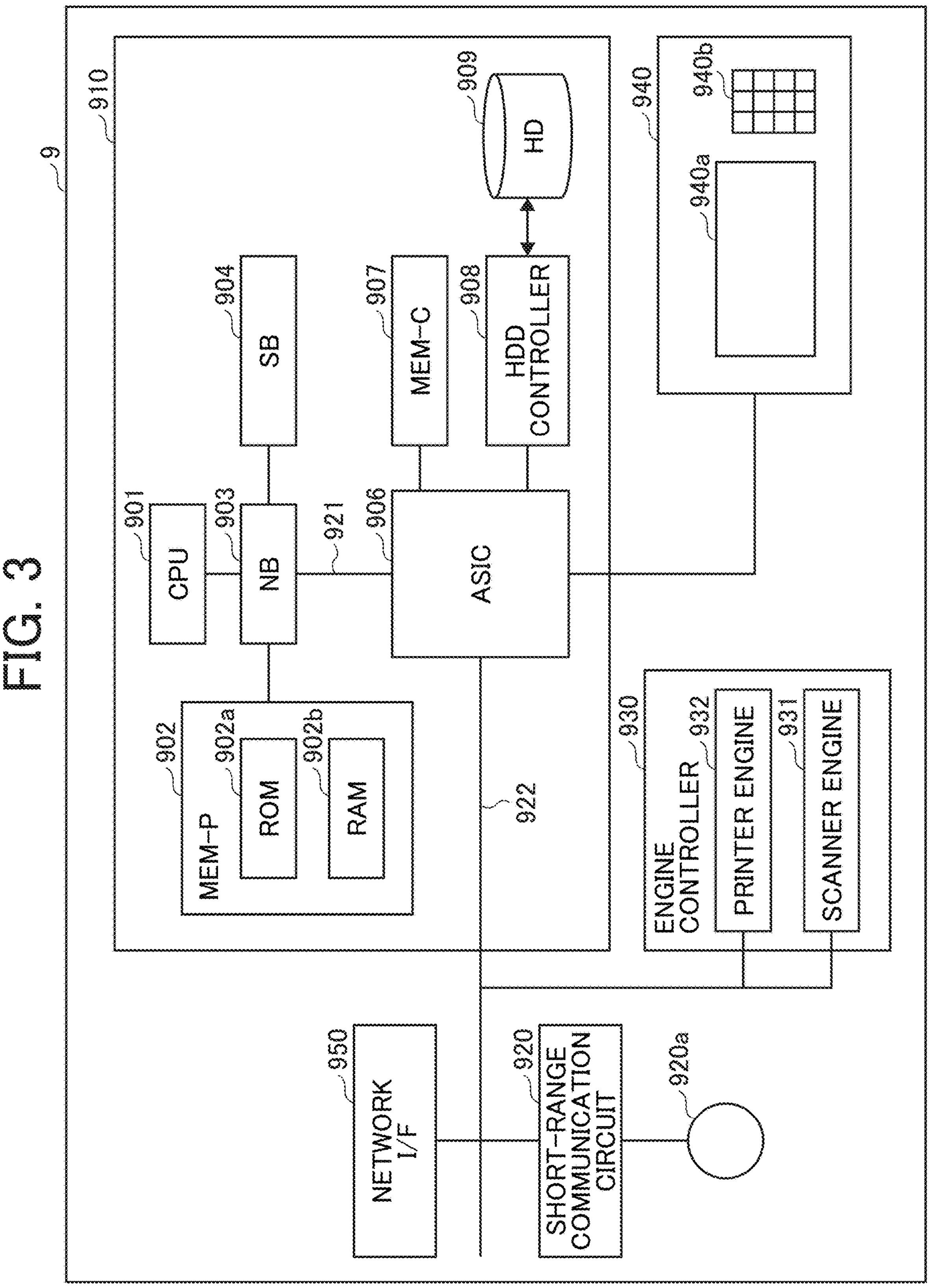
FIG. 3 is a diagram illustrating an example of a hardware configuration of an image forming apparatus according to the embodiment.

Next, the hardware configuration of the image forming apparatus 9 will be described. FIG. 3 is a block diagram illustrating an example of the hardware configuration of a control section of the image forming apparatus according to the embodiment.

As illustrated in FIG. 3, the image forming apparatus 9 includes a controller 910, a short-range communication circuit 920, an engine controller 930, an operation panel 940, and a network I/F 950.

Among these, the controller 910 includes a CPU 901 that is a main part of a computer, a system memory (MEM-P) 902, a north bridge (NB) 903, a south bridge (SB) 904, and an application specific integrated circuit (ASIC) 906. The controller 910 also includes a local memory (MEM-C) 907 as a memory, an HDD controller 908, and an HD 909 as a memory. The NB 903 and the ASIC 906 are connected by an accelerated graphics port (AGP) bus 921.

Among these, the CPU 901 is a controller that performs overall control of the image forming apparatus 9. The NB 903 is a bridge for connecting the CPU 901, the MEM-P 902, the SB 904, and the AGP bus 921. The NB 903 includes a memory controller, a Peripheral Component Interconnect (PCI) master, and an AGP target. The memory controller controls, for example, the reading/writing of data from/to the MEM-P 902.

The MEM-P 902 includes a ROM 902*a* and a RAM 902*b*. The ROM 902*a* is a memory for storing programs and data for implementing each function of the controller 910. The RAM 902*b* is used as, for example, a drawing memory at the time of developing programs and data and memory printing. Note that a program to be stored in the RAM 902*b* may be provided as a file recorded on a computer-readable recording medium, such as a compact disc read only memory (CD-ROM), compact disc recordable (CD-R), or DVD, in a format that allows installation or execution.

The SB 904 is a bridge for connecting the NB 903 with a PCI device and a peripheral device. The ASIC 906 is an integrated circuit (IC) for image processing, which includes a hardware element for image processing. The ASIC 906 functions as a bridge for connecting the AGP bus 921, a PCI bus 922, the HDD controller 908, and the MEM-C 907 to each other.

The ASIC 906 includes a PCI target, an AGP master, an arbiter (ARB), a memory controller, a plurality of direct memory access controllers (DMACs), and a PCI unit. The ARB forms the core of the ASIC 906. The memory controller controls the MEM-C 907. The plurality of DMACs performs, for example, rotation of image data by hardware logic or the like. The PCI unit implements data transfer between a scanner engine 931 and a printer engine 932 via the PCI bus 922.

Note that the ASIC 906 may be connected to a USB interface or an Institute of Electrical and Electronics Engineers 1394 (IEEE 1394) interface.

The MEM-C 907 is a local memory to be used as an image buffer for copying and a code buffer. The HD 909 is a storage for storing image data, font data to be used during printing, and forms. The HDD controller 908 controls the reading of data from or the writing of data to the HD 909 under the control of the CPU 901.

The AGP bus 921 is a bus interface for a graphics accelerator card proposed for increasing the speed of graphics processing. As a result of directly accessing the MEM-P 902 with high throughput, it is possible to increase the speed of the graphics accelerator card.

The short-range communication circuit 920 includes a short-range communication circuit 920*a*. The short-range communication circuit 920 is a communication circuit based on Near Field Communication (NFC), Bluetooth (registered trademark), or the like.

The engine controller 930 includes the scanner engine 931 and the printer engine 932. The operation panel 940 includes a panel display 940*a* and an operation panel 940*b*. The panel display 940*a* is, for example, a touch panel that displays a current setting value, a selection screen, and the like to receive an input from an operator. The operation panel 940*b* includes a numeric keypad, a start key, and the like. The numeric keypad is used for receiving setting values for printing conditions such as a density setting condition. The start key is used for receiving a copy start instruction.

The controller 910 controls the entire image forming apparatus 9 to control, for example, drawing, communication, and input from the operation panel 940. The scanner engine 931 or the printer engine 932 includes an image processing part for error diffusion, gamma conversion, and the like.

Note that it is possible, in the image forming apparatus 9, to sequentially switch between a document box function, a copy function, a printer function, and a facsimile function to select a desired function from among these functions, with an application switching key on the operation panel 940. The mode is set to the document box mode when the document box function is selected. The mode is set to the copy mode when the copy function is selected. The mode is set to the printer mode when the printer function is selected. The mode is set to the facsimile mode when the facsimile mode is selected.

The network I/F 950 is an interface for performing data communication by use of the network 100. The short-range communication circuit 920 and the network I/F 950 are electrically connected to the ASIC 906 via the PCI bus 922.

Configuration of Image Forming Apparatus

Figure 4:
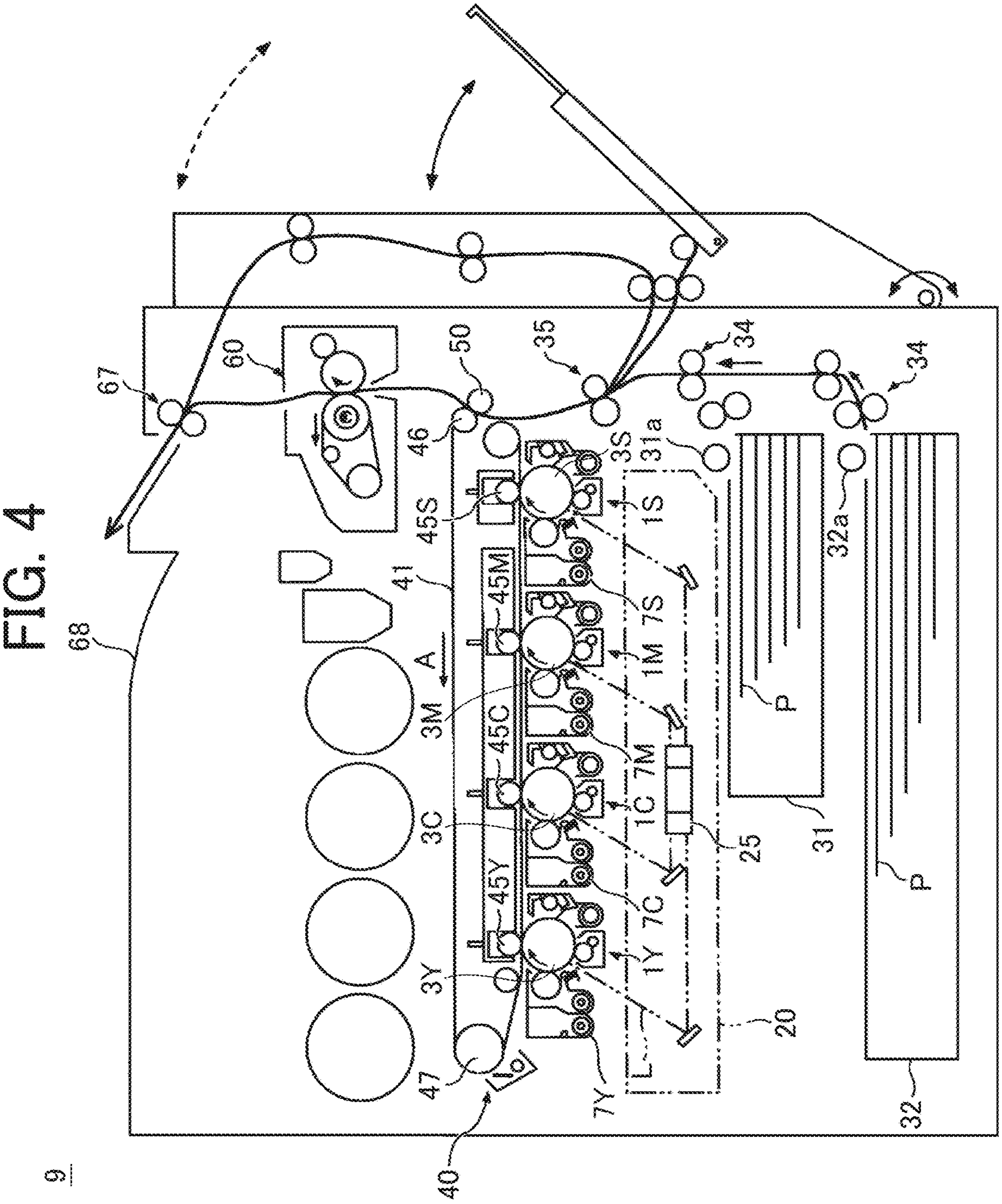
FIG. 4 is a diagram illustrating an example of a configuration of the image forming apparatus according to the embodiment.

Next, the configuration of the image forming apparatus 9 will be described. FIG. 4 is a diagram illustrating an example of the configuration of the image forming apparatus according to the embodiment.

As illustrated in FIG. 4, the image forming apparatus 9 includes four image forming units 1C, 1M, 1Y, and 1S (hereinafter referred to as image forming units 1 when there is no need to distinguish between these image forming units; the same applies to other components) so as to form an image of each color of cyan (C), magenta (M), yellow (Y), and IR (S).

The conventional image forming apparatus includes four image forming units that perform image formation with toners of four colors of cyan, magenta, yellow, and black, respectively. In contrast, the image forming apparatus 9 according to the embodiment includes an IR toner image forming unit instead of a black toner image forming unit. The image forming units 1 have the same configuration except that the image forming units 1 are different in toner color. Therefore, as a result of replacing the black toner image forming unit with the IR toner image forming unit, it is possible to perform image formation with IR toner without significantly changing the configuration of the image forming apparatus. Each of the image forming units 1 includes a drum-shaped image bearer 3. The four image bearers 3 are equally spaced apart in the moving direction of an intermediate transfer belt 41 and arranged in parallel inside the image forming apparatus 9. The peripheral surface of each of the image bearers 3 rotates in the same direction as the conveyance direction of the intermediate transfer belt 41, which faces the image bearers 3, by a driving force transmitted from a driving source such as a motor.

An optical writing unit 20 is provided below the image forming unit 1. The optical writing unit 20 irradiates the image bearer 3 with laser light L based on print data to form an electrostatic latent image on the image bearer 3. FIG. 4 illustrates the optical writing unit 20 that irradiates the image bearer 3 with the laser light L through a plurality of lenses and mirrors while deflecting the laser light L with a polygon mirror 25 that is rotationally driven. However, the optical writing unit 20 is not limited to this. A light-emitting diode (LED) array method or the like may be used.

The electrostatic latent image formed on the image bearer 3 is developed by a developing unit 7. As a result, a developed toner image is formed on the image bearer 3. The intermediate transfer belt 41 is provided above the image bearer 3. One end of the intermediate transfer belt 41 is wound around a driven roller 47. The other end is wound around a transfer driving roller 46.

As the transfer driving roller 46 rotates while being driven by the driving source, the intermediate transfer belt 41 travels in the direction of arrow A, and the surface of each image bearer 3 comes into contact with the lower surface of the intermediate transfer belt 41. Four primary transfer rollers 45 are provided on the inner periphery of the intermediate transfer belt 41 so as to face the respective image bearers 3. As a result of applying bias at the positions of the primary transfer rollers 45, the toner images of the respective colors on the image bearers 3 are sequentially superimposed and primarily transferred onto the intermediate transfer belt 41. In other words, toner images formed with toners of the three colors of C, M, and Y and a toner image formed with IR toner are superimposed and primarily transferred onto the intermediate transfer belt 41.

A belt cleaning unit 40 having a toner image removing function is provided on an outer periphery near the left end of the intermediate transfer belt 41. The belt cleaning unit can wipe off unnecessary toner remaining on the surface of the intermediate transfer belt 41 and foreign matter such as paper dust.

A secondary transfer roller 50 is provided on the outer periphery of the intermediate transfer belt 41, at a position where the secondary transfer roller 50 faces the transfer driving roller 46 with the intermediate transfer belt 41 interposed between the secondary transfer roller 50 and the transfer driving roller 46. The secondary transfer roller 50 is in contact with the intermediate transfer belt 41 to form a secondary transfer nip at the position where the secondary transfer roller 50 faces the transfer driving roller 46.

Paper feed trays 31 and 32 store a plurality of recording media P stacked in each internal space. Paper feed rollers 31*a* and 32*a* are provided as rotating members on the right ends of the paper feed trays 31 and 32 in the drawing. The paper feed rollers 31*a* and 32*a* are in contact with the uppermost parts of the bundles of the recording media P stacked and placed on the paper feed trays 31 and 32, respectively. Thus, the paper feed rollers 31*a* and 32*a* can send the uppermost recording media P out.

The paper feed rollers 31*a* and 32*a* do not necessarily need to be in the form of rollers, as long as the paper feed rollers 31*a* and 32*a* can convey the recording media P in predetermined directions. Endless rotary belts or the like that are each stretched around two rollers may be used instead of the paper feed rollers 31*a* and 32*a*.

When the paper feed roller 31*a* or 32*a* is rotationally driven, the uppermost recording medium P is conveyed toward the rollers of a registration roller pair 35 via a conveying roller pair 34.

The recording medium P conveyed to the registration roller pair 35 temporarily stops at a roller nip of the registration roller pair 35 that has stopped being rotationally driven. Then, the registration roller pair 35 is rotationally driven in synchronization with the color image on the intermediate transfer belt 41. Thus, the recording medium P is conveyed toward the secondary transfer nip.

As the recording medium P passes through the secondary transfer nip between the intermediate transfer belt 41 and the secondary transfer roller 50, bias is applied. As a result, the toner images of the respective colors superimposed and primarily transferred onto the intermediate transfer belt 41 are secondarily transferred onto the recording medium P at the secondary transfer nip. In other words, the toner images formed with toners of the three colors of C, M, and Y and the toner image formed with IR toner, which have been superimposed and primarily transferred onto the intermediate transfer belt 41, are secondarily transferred onto the recording medium P.

The recording medium P on which the color image has been secondarily transferred at the secondary transfer nip is conveyed to a fixing unit 60. At this position, the color image secondarily transferred onto the recording medium P is fixed on the recording medium P by heat and pressure generated by a fixing belt and a pressure roller.

Thereafter, the recording medium P is discharged out of the apparatus through the rollers of a paper ejection roller pair 67. The recording medium P discharged out of the apparatus by the paper ejection roller pair 67 is sequentially stacked as an output image on a stack unit 68. Thus, a series of image forming processes is completed in the image forming apparatus 9.

First Embodiment

Functional Configuration of Information Processing Apparatus

Figure 5:
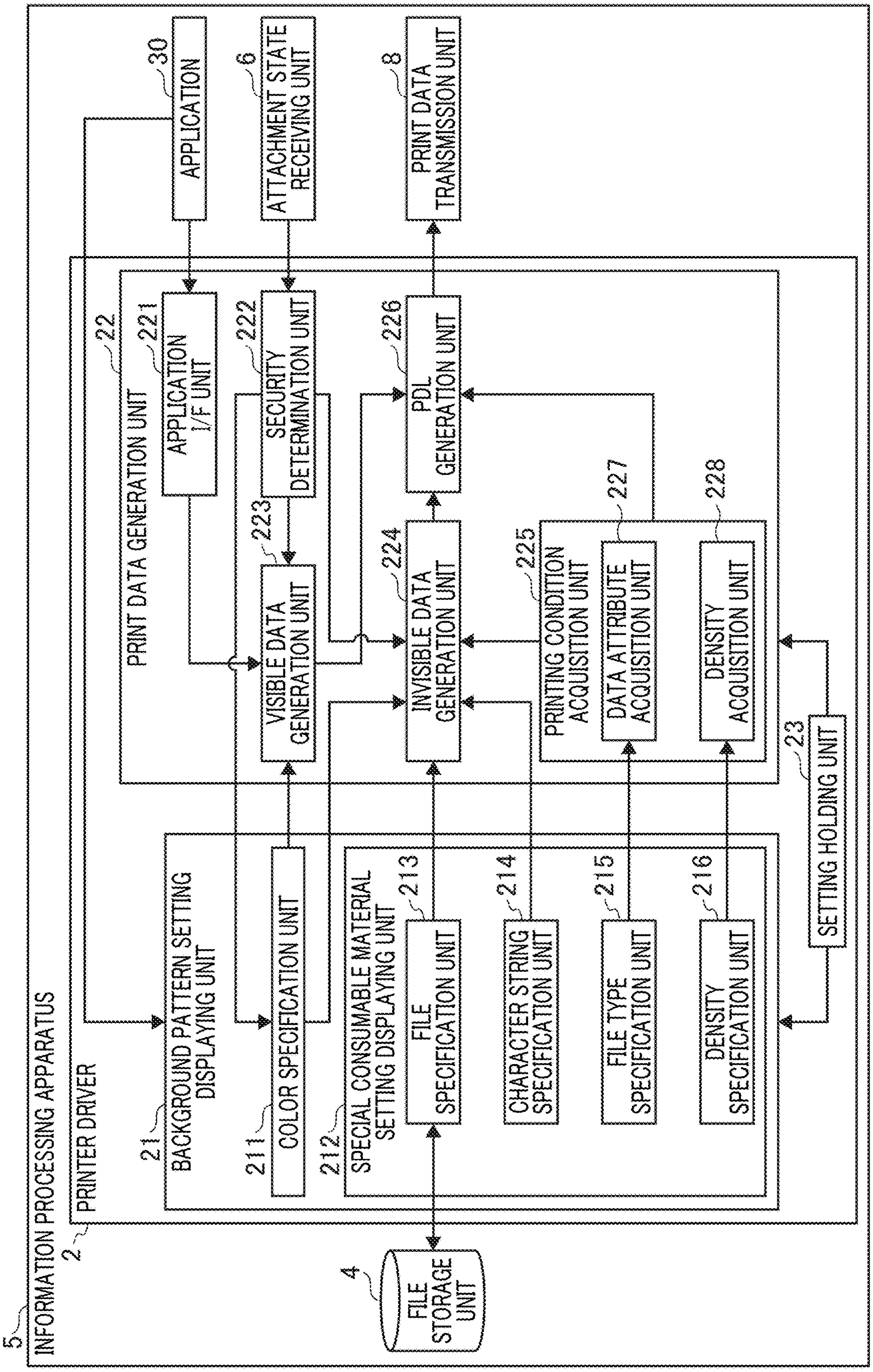
FIG. 5 is a diagram illustrating an example of a functional configuration of an information processing apparatus according to a first embodiment.

Next, a functional configuration of the information processing apparatus 5 according to a first embodiment will be described. FIG. 5 is a block diagram illustrating an example of the functional configuration of the information processing apparatus according to the present embodiment. As illustrated in FIG. 5, the information processing apparatus 5 includes a printer driver 2, a file storage unit 4, an attachment state receiving unit 6, and a print data transmission unit 8. The printer driver 2 includes a background pattern setting displaying unit 21 and a print data generation unit 22.

The printer driver 2 is implemented by the CPU 501 illustrated in FIG. 2 executing a predetermined program such as a printer driver. The information processing apparatus 5 also executes other programs such as a general operating system (OS). However, for descriptive purposes, description on the functional configurations of the other programs will be omitted below. The file storage unit 4 is implemented by, for example, the HD 504 illustrated in FIG. 2. The attachment state receiving unit 6 and the print data transmission unit 8 are implemented by, for example, the network I/F 509 illustrated in FIG. 2.

When a user requests to print using an application, the background pattern setting displaying unit 21 controls a display, such the display 506, to display a setting screen that allows a user to configure various settings related to background pattern printing. In the settings related to background pattern printing, the user sets, for example, information such as a character string to be printed as the background pattern, the font, size, density, and color of characters in the character string, and a position where the character string is to be printed.

The background pattern setting displaying unit 21 includes a color specification unit 211 and a special consumable material setting displaying unit 212.

The color specification unit 211 controls the background pattern setting displaying unit 21 to display the setting screen that allows a user to set a color for the information to be printed as the background pattern. This color refers to the color of toner to be used for printing. In the embodiment, IR is included in the color for information to be printed as the background pattern. Specifically, the color specification unit 211 displays on the setting screen such that IR toner can be designated as the color for information to be printed as the background pattern.

For example, the color specification unit 211 allows the user to designate any of “cyan”, “magenta”, “black”, and “IR” via the setting screen. When the user designates “cyan”, “magenta”, or “black”, the designated color is set such that information such as a character string of the background pattern is printed as a background pattern in the designated color. That is, the designated color is set such that information such as a character string of the background pattern is printed, in the designated color, as a “pattern made of small dots and large dots printed so as to be embedded in the background of a print target image”. Meanwhile, when the user designates “TR”, the special consumable material setting displaying unit 212 displays a setting screen for the settings of printing with IR toner, as described below.

The special consumable material setting displaying unit 212 controls a display, such as the display 506, to display a setting screen for configuring various settings related to printing with IR toner, to receive a setting operation by the user. In the settings related to printing with IR toner, for example, a pattern such as a character or an image to be printed with IR toner and printing conditions for printing with IR toner can be set.

In the embodiment, the background pattern setting screen is used for the setting of printing with IR toner. Therefore, a pattern to be printed with IR toner is designated as a background pattern. However, a pattern to be printed with IR toner does not necessarily need to be a background pattern. In other words, a pattern to be printed with IR toner does not necessarily need to be a “pattern made of small dots and large dots printed so as to be embedded in the background of a print target image”, and may be, for example, a figure such as a bar code or a photograph. The “pattern to be printed with IR toner” specified on an IR toner print setting screen is an example of “information specified as the background pattern”. The information specified as the background pattern is any information to be printed as the background pattern.

The special consumable material setting displaying unit 212 includes a file specification unit 213, a character string specification unit 214, a file type specification unit 215, and a density specification unit 216.

The file specification unit 213 controls the display, such as the display 506, to display the IR toner print setting screen such that allows the user to specify, as a setting item, a file storing a pattern such as a character or image to be printed with IR toner. The file specification unit 213 receives a user input of a file name.

Based on the file name that is input, the file specification unit 213 refers to the file storage unit 4 to acquire the file. The file storage unit 4 stores a plurality of files storing various patterns to be printed with IR toner. Then, the file specification unit 213 outputs the acquired file to an invisible data generation unit 224.

In the embodiment, it is possible to acquire a file of a pattern to be printed with IR toner. As a result, not only characters but also images such as bar codes and photographs can be printed with IR toner. It is, however, desirable to assign a dedicated extension to a file of a pattern to be printed with IR toner. This is because the file can be easily distinguished from other files.

The character string specification unit 214 controls the display, such as the display 506, to display the IR toner print setting screen that allows the user to specify, as a setting item, a character string to be printed with TR toner. The character string specification unit 214 receives a user input of a character string. The character string specification unit 214 outputs information on the specified character string to the invisible data generation unit 224.

The file type specification unit 215 controls the display, such as the display 506, to display the IR toner print setting screen that allows the user to specify, as a setting item, the type of a file storing a pattern to be printed with IR toner. Here, the “file type” is information indicating the data attribute of a pattern to be printed with IR toner stored in the file. More specifically, the “file type” is information for determining whether the pattern to be printed with IR toner is, for example, a character, a symbol such as a bar code or QR code (registered trademark), or a photograph. The file type specification unit 215 outputs information on the specified file type to a data attribute acquisition unit 227.

The density specification unit 216 controls the display, such as the display 506, to display the IR toner print setting screen that allows the user to specify, as a setting item, a density for a pattern to be printed with IR toner. The density specification unit 216 outputs information on the specified density to a density acquisition unit 228.

Next, the print data generation unit 22 will be described.

The print data generation unit 22 creates print data to be printed by the image forming apparatus 9 based on data to be printed. Then, the print data generation unit 22 transmits the created print data to the image forming apparatus 9 via the print data transmission unit 8.

The print data generation unit 22 includes an application I/F unit 221, a security determination unit 222, a visible data generation unit 223, the invisible data generation unit 224, a printing condition acquisition unit 225, and a page description language (PDL) generation unit 226.

The application I/F unit 221 is an interface for inputting data on a print target image from an application 30. The application 30 is a general application such as a word processor or a spreadsheet that outputs colors specified with R, G, and B. The print target image is an image such as a character, figure, or photograph created by the application 30. The application I/F unit 221 outputs the input data on the print target image to the visible data generation unit 223.

The security determination unit 222 determines whether the image forming apparatus 9 can print with IR toner, according to the attachment state of the container of IR toner received from the image forming apparatus 9 via the attachment state receiving unit 6.

More specifically, when a container such as an IR toner cartridge is not attached to the image forming apparatus 9, it is not possible to perform printing with IR toner. Therefore, when the IR toner cartridge is not attached to the image forming apparatus 9, the security determination unit 222 receives attachment state information indicating that the IR toner cartridge is not attached, via the attachment state receiving unit 6. As a result, the security determination unit 222 determines that it is not possible to perform printing with IR toner. Then, the security determination unit 222 notifies the color specification unit 211 of a determination result. The color specification unit 211 controls the display, such as the display 506, to display a notification indicating that "IR" cannot be designated, according to the determination result. Alternatively, the color specification unit 211 causes the display not to display "IR". This prevents a user from designating "IR".

As another example, when a container such as the IR toner cartridge is not attached to the image forming apparatus 9, the security determination unit 222 may notify the visible data generation unit 223 to be described below of the determination result. The visible data generation unit 223 generates drawing data on a background pattern drawn with C, M, Y, or K according to the determination result. As a result, a background pattern can be printed with C, M, Y, or K instead of IR toner.

The visible data generation unit 223 have the function of performing color conversion such that the data on the print target image specified with R, G, and B input from the application I/F unit 221 are converted into data specified with C, M, Y, and K to generate visible data drawn with C, M, Y, and K.

In the embodiment, when "IR" is designated in the color specification unit 211, the visible data generation unit 223 generates visible data in which the color-converted data are drawn with C, M, and Y. Visible data are generated such that the black color part of the print target image is printed with three color toners of C, M, and Y as described above.

When "IR" is designated at the color specification unit 211, the invisible data generation unit 224 generates invisible data in which information specified as the background pattern is drawn with black.

As described above, the image forming apparatus 9 is equipped with IR toner instead of black toner in the embodiment. Thus, the invisible data generation unit 224 generates invisible data in which information specified as the background pattern is drawn with black. As a result, it is possible to generate print data on a pattern to be printed with IR toner.

Furthermore, the invisible data generation unit 224 can generate invisible data based on the file specified at the file specification unit 213 or the information on the character string specified at the character string specification unit 214 and printing conditions input from the printing condition acquisition unit 225.

As an example, when a file is specified at the file specification unit 213 and a "photograph" is designated at the file type specification unit 215 as one of the printing conditions, the invisible data generation unit 224 generates invisible data on a pattern to be printed with IR toner as a dot image. In this embodiment, a "photograph" corresponds to the file type "others" in FIG. 8 to be described below.

As another example, when a file is specified at the file specification unit 213 and a "bar code" as an example of a figure is designated at the file type specification unit 215, the invisible data generation unit 224 generates invisible data on a pattern to be printed with IR toner as a solid image.

The printing condition acquisition unit 225 includes the data attribute acquisition unit 227 and the density acquisition unit 228, and acquires printing conditions for printing with IR toner. The data attribute acquisition unit 227 acquires the data attribute of a pattern to be printed with IR toner, based on the file type information input from the file type specification unit 215. The density acquisition unit 228 acquires a density for a pattern to be printed with IR toner, based on the density information input from the density specification unit 216. The printing condition acquisition unit 225 can output, to the invisible data generation unit 224 and the PDL generation unit 226, printing conditions including the data attribute and density of a pattern to be printed with IR toner.

The PDL generation unit 226 generates a PDL based on visible data input from the visible data generation unit 223 and invisible data input from the invisible data generation unit 224. The PDL generation unit 226 can output, to the image forming apparatus 9 via the print data transmission unit 8, print data in which the printing conditions input from the printing condition acquisition unit 225 have been added to, for example, the header of the PDL.

A setting holding unit 23 has the function of temporarily holding respective settings made by the background pattern setting displaying unit 21 and the print data generation unit 22.

Figure 6:
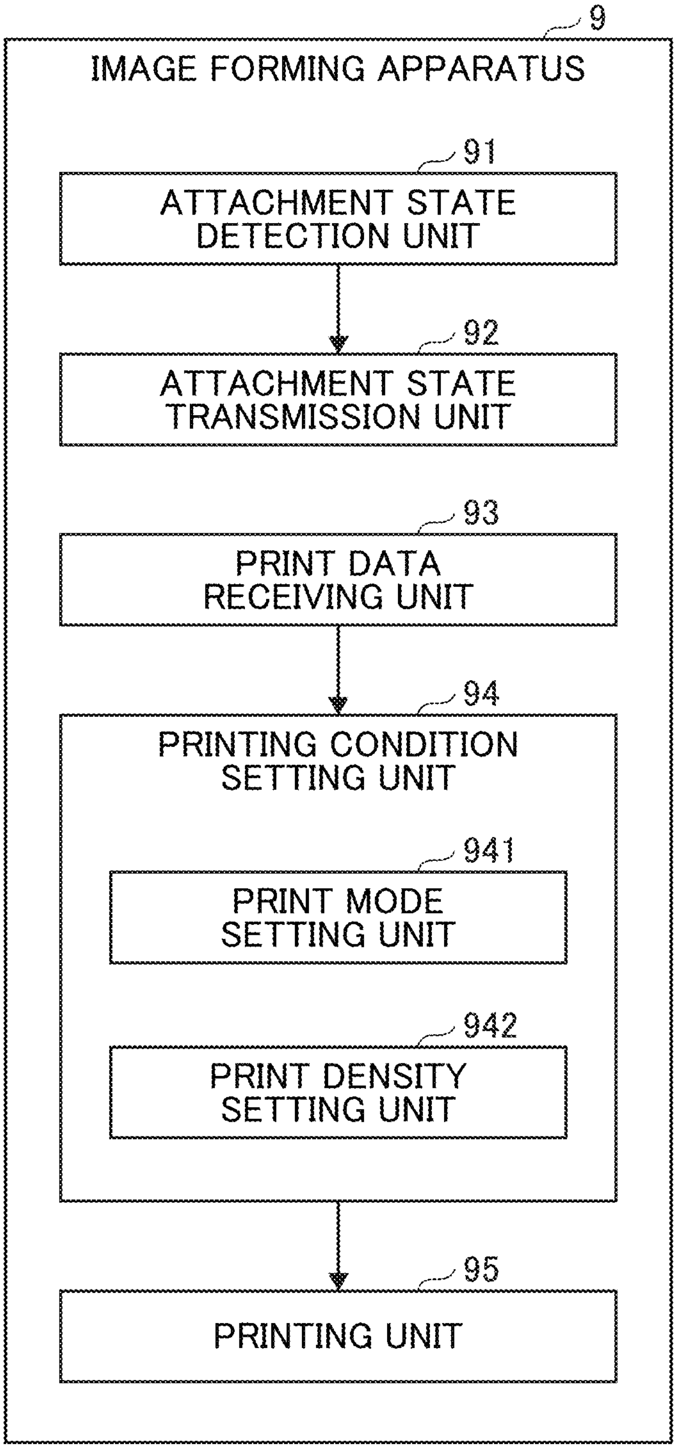
FIG. 6 is a diagram illustrating an example of a functional configuration of an image forming apparatus according to the embodiment.

Next, the functional configuration of the image forming apparatus 9 will be described. FIG. 6 is a block diagram illustrating an example of the functional configuration of the image forming apparatus according to the embodiment.

As illustrated in FIG. 6, the image forming apparatus 9 includes an attachment state detection unit 91, an attachment state transmission unit 92, a print data receiving unit 93, a printing condition setting unit 94, and a printing unit 95. In the image forming apparatus 9, the CPU 901 illustrated in FIG. 3 executes a predetermined program to implement the attachment state detection unit 91, the printing condition setting unit 94, and the like. Any one of the attachment state detection unit 91 and the printing condition setting unit 94 may be implemented by hardware, such a circuit.

The attachment state transmission unit 92 and the print data receiving unit 93 are implemented by, for example, the network I/F 950 illustrated in FIG. 3. The printing unit 95 can be implemented by the controller 910 (including the CPU 901) illustrated in FIG. 3 causing the image forming apparatus 9 to execute an instruction or the like received by the image forming apparatus 9 from the information processing apparatus 5.

The attachment state detection unit 91 detects the attachment state of the IR toner cartridge in the image forming apparatus 9, and outputs attachment state information to the information processing apparatus 5 via the attachment state transmission unit 92.

Here, the toner cartridge includes an IC chip that stores a cartridge ID, the type of contained toner, the amount of remaining toner, and the like. Therefore, the attachment state detection unit 91 can detect the attachment state of the IR toner cartridge in the image forming apparatus 9 with reference to the IC chip of the toner cartridge.

The printing condition setting unit 94 receives print data via the print data receiving unit 93. In a case where the print data includes invisible data or in a case where the print data includes printing conditions for printing with IR toner, the printing condition setting unit 94 sets the printing conditions for printing with IR toner.

Here, the "case where the print data includes invisible data" and the "case where the print data includes printing conditions for printing with IR toner" are each an example of a "case where printing with a special consumable material is instructed by the information processing apparatus". However, such a case is not limited to these examples. The information processing apparatus 5 may, for example, transmit a predetermined instruction signal to the image forming apparatus 9 to instruct the image forming apparatus 9 to print with a special consumable material.

As an example, the printing condition setting unit 94 can rewrite a table containing various input setting values regarding printing conditions provided in the image forming apparatus 9, to set the printing conditions. The printing condition setting unit 94 includes a print mode setting unit 941 and a print density setting unit 942.

The print mode setting unit 941 can set a print mode according to a data attribute among the printing conditions. More specifically, when the data attribute is a character or a symbol such as a bar code, the print mode setting unit 941 sets, as a developing bias for printing with IR toner, a voltage approximately several volts lower than a developing bias determined in the process control of the image forming apparatus 9. In addition, the print mode setting unit 941 sets the print mode to a solid image. The developing bias as a voltage lower by approximately several volts is, for example, a developing bias reduced by 40% from the developing bias determined in the process control.

Printing in the solid image mode increases the amount of IR toner adhering to a recording medium. Thus, there are cases where a pattern printed on the recording medium with IR toner may be slightly recognized when visually checked. In the embodiment, a developing bias lower than the developing bias determined in the process control is set to perform printing. As a result, the amount of toner adhering to a recording medium can be reduced. It is thus possible to avoid the case where a pattern printed on the recording medium with IR toner is recognized when visually checked.

In addition, when the data attribute is a photograph, the print mode setting unit 941 sets, as a developing bias for printing with IR toner, the developing bias determined in the process control of the image forming apparatus 9, and also sets the print mode to a dot image. As a result of setting the print mode to a dot image, it is possible to print a photograph with a smoother gradation of color.

The print density setting unit 942 can set developing bias and the like according to density among the printing conditions. Note that this density is different from a density to be determined according to a data attribute, and is a density specified by a user according to user preferences.

The printing condition setting unit 94 outputs the print data to the printing unit 95 after setting the printing conditions.

Based on the input print data, the printing unit 95 can print a pattern formed by three color toners of C, M, and Y and a pattern formed by IR toner superimposed on a recording medium.

Example of Background Pattern Setting Screen

Figure 7:
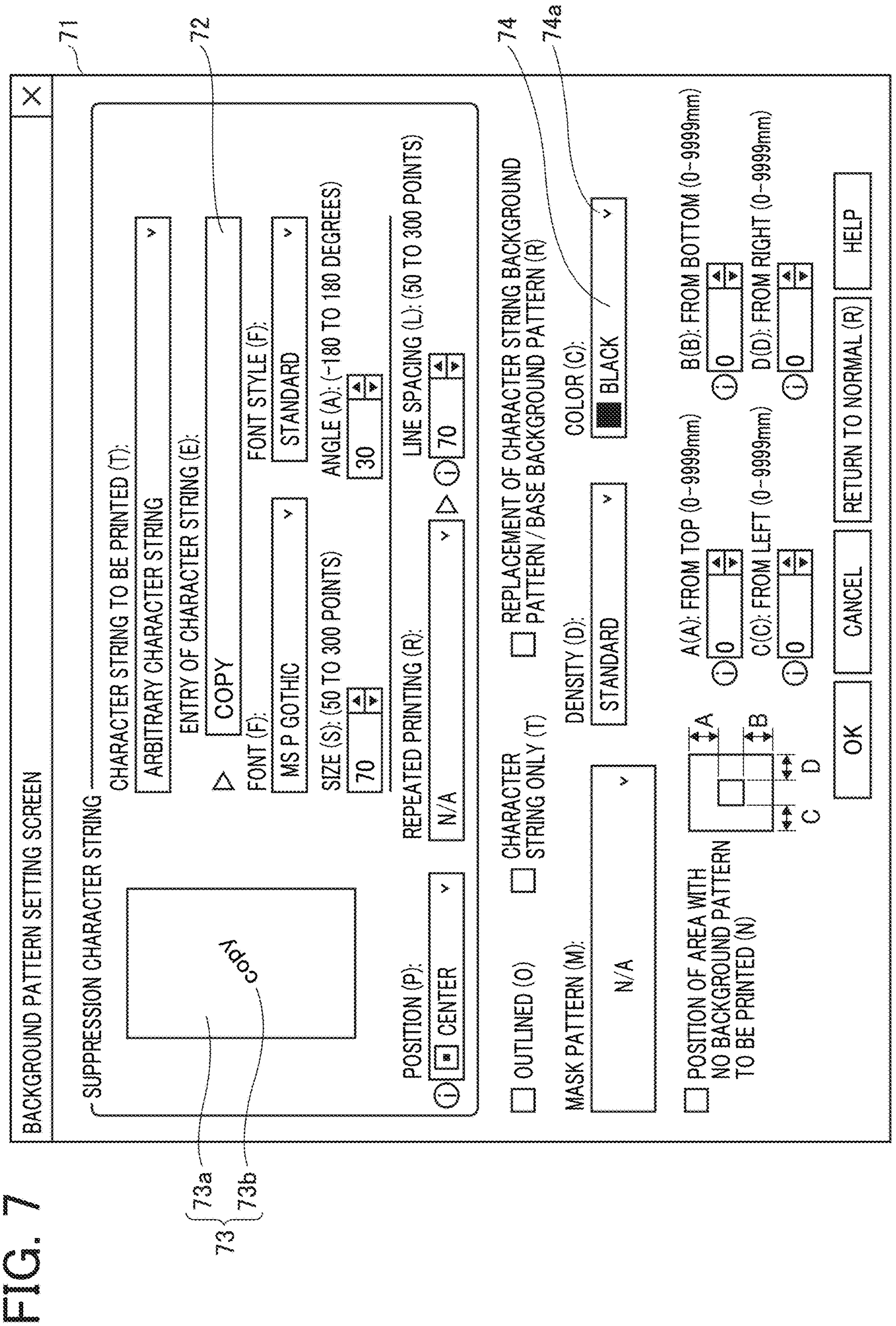
FIG. 7 is a diagram illustrating an example of a background pattern setting screen according to the first embodiment.

Next, FIG. 7 is a diagram illustrating an example of a background pattern setting screen according to the first embodiment. This diagram illustrates an example of a background pattern setting screen to be displayed on, for example, the display 506 of FIG. 2 by the background pattern setting displaying unit 21 of the information processing apparatus 5.

A background pattern edit box 72 at the upper right of a background pattern setting screen 71 is a field for input of a character string to be printed as a background pattern. FIG. 7 illustrates an example of inputting the character string "COPY".

In addition, a review image 73 including a recording medium image 73*a* and a background pattern image 73*b* is displayed in an area where the characters "suppression character string" are displayed at the upper left of the screen. The background pattern image 73*b* "COPY" is displayed in accordance with the character string input to the background pattern edit box 72. The background pattern image 73*b* in the review image 73 indicates a pattern that emerges from a recording medium as a copy of a printed recording medium to be visible.

A color list box 74 at the lower right of the screen is a field displayed on the background pattern setting screen 71 by the color specification unit 211 such that the user can specify a color for the information specified as the background pattern. When an expansion button 74*a* shown at the right end of the color list box 74 is clicked, colors that can be designated are displayed as a plurality of options. As an example, "cyan", "magenta", "black", and "IR" are displayed as four options.

A user can select one of these options to specify a color for the information specified for the background pattern. FIG. 7 illustrates an example in which "black" is designated. Thus, "black" is indicated in the color list box 74.

When the user designates any one of "cyan", "magenta", or "black" in the color list box 74, the character string input to the background pattern edit box 72 is printed as a background pattern, that is, a "pattern made of small dots and large dots printed so as to be embedded in the background of a print target image". Meanwhile, when the user designates "IR" in the color list box 74, a setting screen for printing with IR toner (hereinafter referred to as an IR toner print setting screen) is displayed as illustrated in FIG. 8 to be described below.

Example of IR Toner Print Setting Screen

Figure 8:
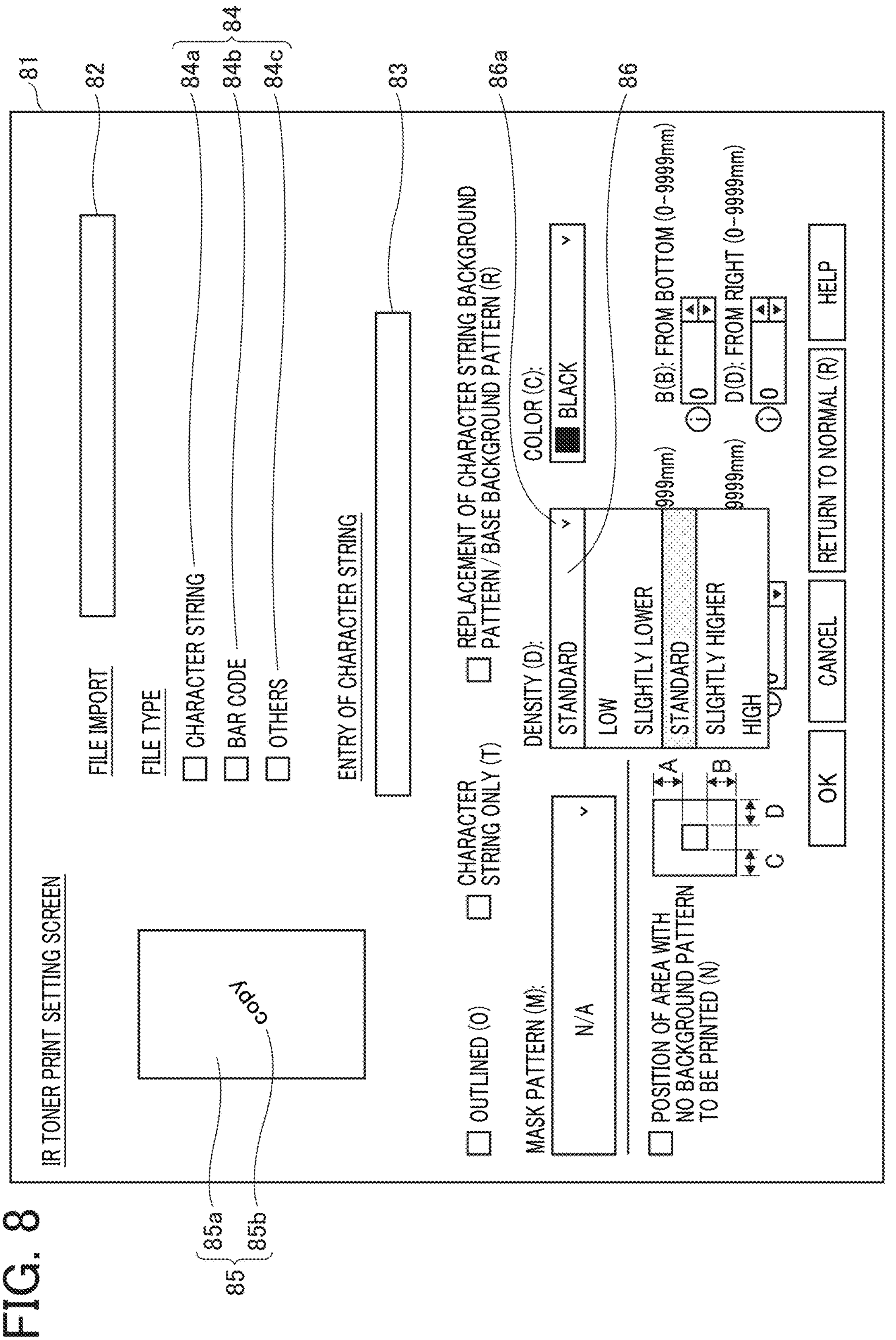
FIG. 8 is a diagram illustrating an example of an infrared (TR) toner print setting screen according to the embodiment.

FIG. 8 is a diagram illustrating an example of an TR toner print setting screen according to the embodiment. This diagram illustrates an example of an IR toner print setting screen to be displayed on, for example, the display 506 of FIG. 2 by the special consumable material setting displaying unit 212 of the information processing apparatus 5.

A file edit box 82 in the upper right of an IR toner print setting screen 81 is a field displayed by the file specification unit 213 as one of setting items on the IR toner print setting screen 81 such that the user can specify a file storing a pattern to be printed with IR toner. A user can input a file name to the file edit box 82 to specify a file.

File type check boxes 84 are displayed below the file edit box 82 on the IR toner print setting screen 81. The file type check boxes 84 include a character string check box 84*a*, a bar code check box 84*b*, and an other-check box 84*c*.

The file type check box 84 is a field displayed by the file type specification unit 215 as one of the setting items on the IR toner print setting screen 81 such that the user can specify the type of a file storing a pattern to be printed with IR toner.

When a character string is included in a file specified in the file edit box 82, a user checks the character string check box 84*a* (for example, puts a check mark in the box-shaped portion). When a bar code is included, the user checks the bar code check box 84*b*. In addition, when a photograph or the like other than a character string and a bar code is included, the user checks the other-check box 84*c*. As a result, the file type can be specified. When the file includes two or more of a character string, a bar code, and others, the user can check two or more of the check boxes.

A character string edit box 83 at the right center of the screen is a field displayed by the character string specification unit 214 as one of the setting items on the IR toner print setting screen 81 such that the user can specify a character string to be printed with IR toner. A user can input a character string to the character string edit box 83 to specify such a character string.

Here, the file edit box 82 and the character string edit box 83 are in an exclusive relationship. That is, the user can input data to either the file edit box 82 or the character string edit box 83 to specify whether to acquire a pattern to be printed with IR toner from file information or character string information.

A density list box 86 at the center of the lower part of the screen is a field displayed by the density specification unit 216 as one of the setting items on the IR toner print setting screen 81 such that the user can specify a density for a pattern to be printed with IR toner. When an expansion button 86*a* shown at the right end of the density list box 86 is clicked, densities that can be designated are displayed as a plurality of options as illustrated in FIG. 8. A user can select one of these options to specify a density. FIG. 8 illustrates an example in which "standard" is designated.

Here, the file type and density displayed on the IR toner print setting screen 81 are each an example of "setting items of printing conditions different from setting items of printing conditions provided in the case of designating any one of cyan, magenta, and yellow".

Figure 9:
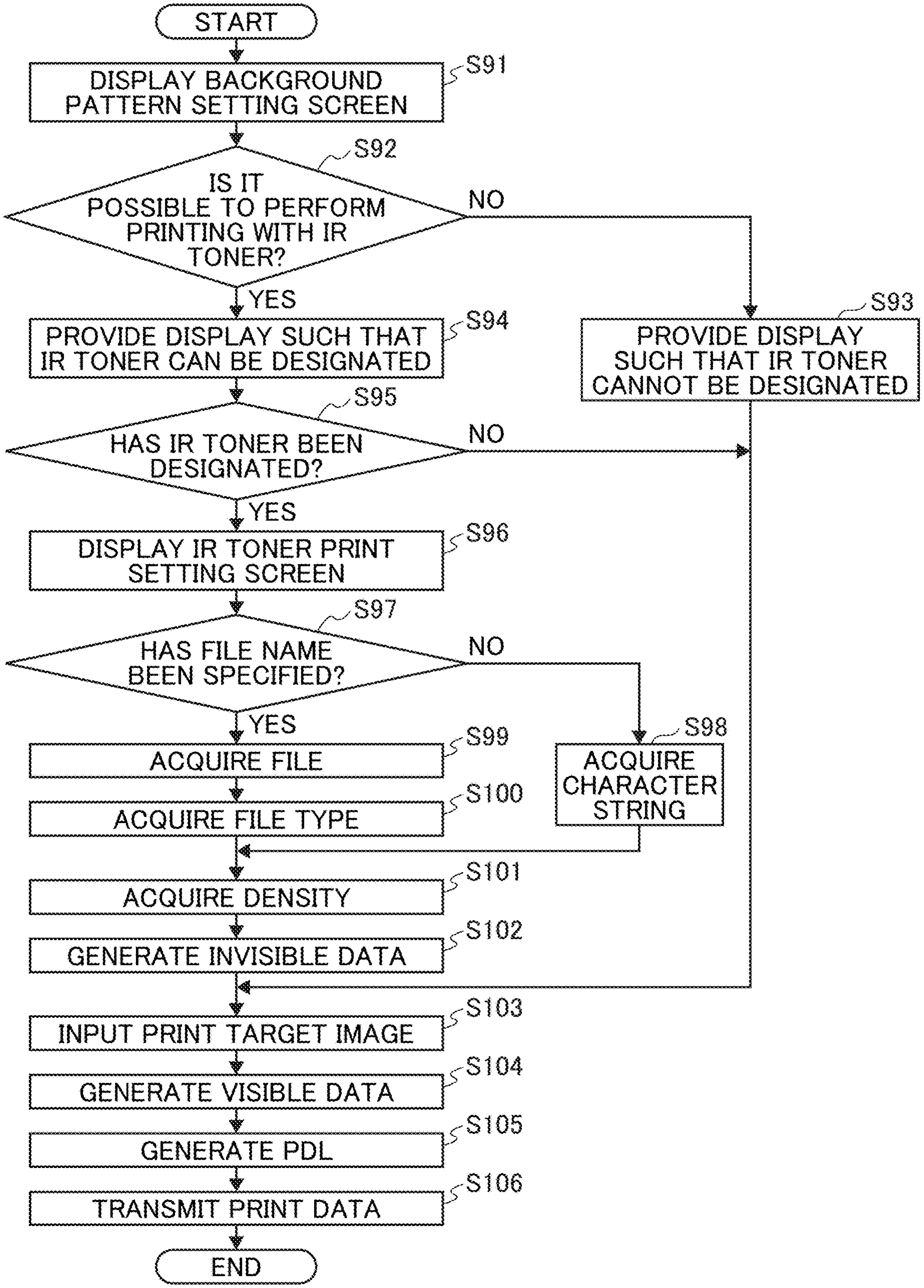
FIG. 9 is a flowchart illustrating an example of processing in the information processing apparatus according to the embodiment.

Next, processing in the information processing apparatus 5 will be described. FIG. 9 is a flowchart illustrating an example of processing in the information processing apparatus according to the embodiment.

First, in step S91, the background pattern setting displaying unit 21 displays a setting screen for allowing a user to configure various settings related to background pattern printing when a request for printing is received from an application.

Subsequently, in step S92, the security determination unit 222 receives information on the attachment state of the IR toner cartridge from the image forming apparatus 9 via the attachment state receiving unit 6. Then, the security determination unit 222 determines whether it is possible to perform printing with IR toner according to the attachment state.

If it is determined in step S92 that printing with IR toner is not possible (step S92, No), the process proceeds to step S93. When receiving notification of the determination result from the security determination unit 222, the color specification unit 211 controls the display 506 to display a notification indicating that IR toner cannot be designated in the color list box 74 of the background pattern setting screen 71. Thereafter, the process proceeds to step S103.

Meanwhile, if it is determined in step S92 that printing with IR toner is possible (step S92, Yes), the process proceeds to step S94. When receiving notification of the determination result from the security determination unit 222, the color specification unit 211 controls the display 506 to display a notification indicating that IR toner can be designated in the color list box 74 of the background pattern setting screen 71.

Subsequently, in step S95, the color specification unit 211 determines whether IR toner has been designated in the color list box 74.

If it is determined in step S95 that IR toner has not been designated (step S95, No), the process proceeds to step S103. Meanwhile, if it is determined that IR toner has been designated (step S95, Yes), the process proceeds to step S96.

Subsequently, in step S96, the special consumable material setting displaying unit 212 displays the IR toner print setting screen.

Subsequently, in step S97, the file specification unit 213 determines whether a file name has been specified by use of the file edit box 82.

If it is determined in step S97 that a file name has not been specified (step S97, No), it means that a character string, which has an exclusive relationship with a file name, has been specified. Thus, the process proceeds to step S98. Then, the character string specification unit 214 acquires a character string specified by use of the character string edit box 83, and outputs information on the character string to the invisible data generation unit 224. Thereafter, the process proceeds to step S101.

Meanwhile, if it is determined in step S97 that a file name has been specified (step S97, Yes), the process proceeds to step S99. Then, the file specification unit 213 acquires the specified file, and outputs the file to the invisible data generation unit 224.

Subsequently, in step S100, the file type specification unit 215 outputs information on a file type specified by use of the file type check box 84 to the data attribute acquisition unit 227.

Subsequently, in step S101, the density specification unit 216 outputs information on a density specified by use of the density list box 86 to the density acquisition unit 228.

Subsequently, in step S102, the invisible data generation unit 224 generates invisible data based on the file specified in the file specification unit 213 or the information on the character string specified in the character string specification unit 214 and printing conditions input from the printing condition acquisition unit 225. Then, the invisible data generation unit 224 outputs the invisible data to the PDL generation unit 226.

Subsequently, in step S103, the visible data generation unit 223 receives data on a print target image specified with R, G, and B input from the application I/F unit 221.

Subsequently, in step S104, the visible data generation unit 223 performs color conversion such that the data on the print target image specified with R, G, and B are converted into data specified with C, M, Y, and K. Then, the visible data generation unit 223 generates visible data in which the color-converted data are drawn with C, M, and Y, and outputs the visible data to the PDL generation unit 226.

Subsequently, in step S105, the PDL generation unit 226 generates a PDL based on the visible data input from the visible data generation unit 223 and the invisible data input from the invisible data generation unit 224. Then, the PDL generation unit 226 outputs, to the print data transmission unit 8, print data in which the printing conditions input from the printing condition acquisition unit 225 have been added to, for example, the header of the PDL.

Subsequently, in step S106, the print data transmission unit 8 outputs the print data to the image forming apparatus 9.

In this way, the information processing apparatus 5 can generate print data including a pattern to be printed with IR toner, and transmit the print data to the image forming apparatus 9.

Figure 10:
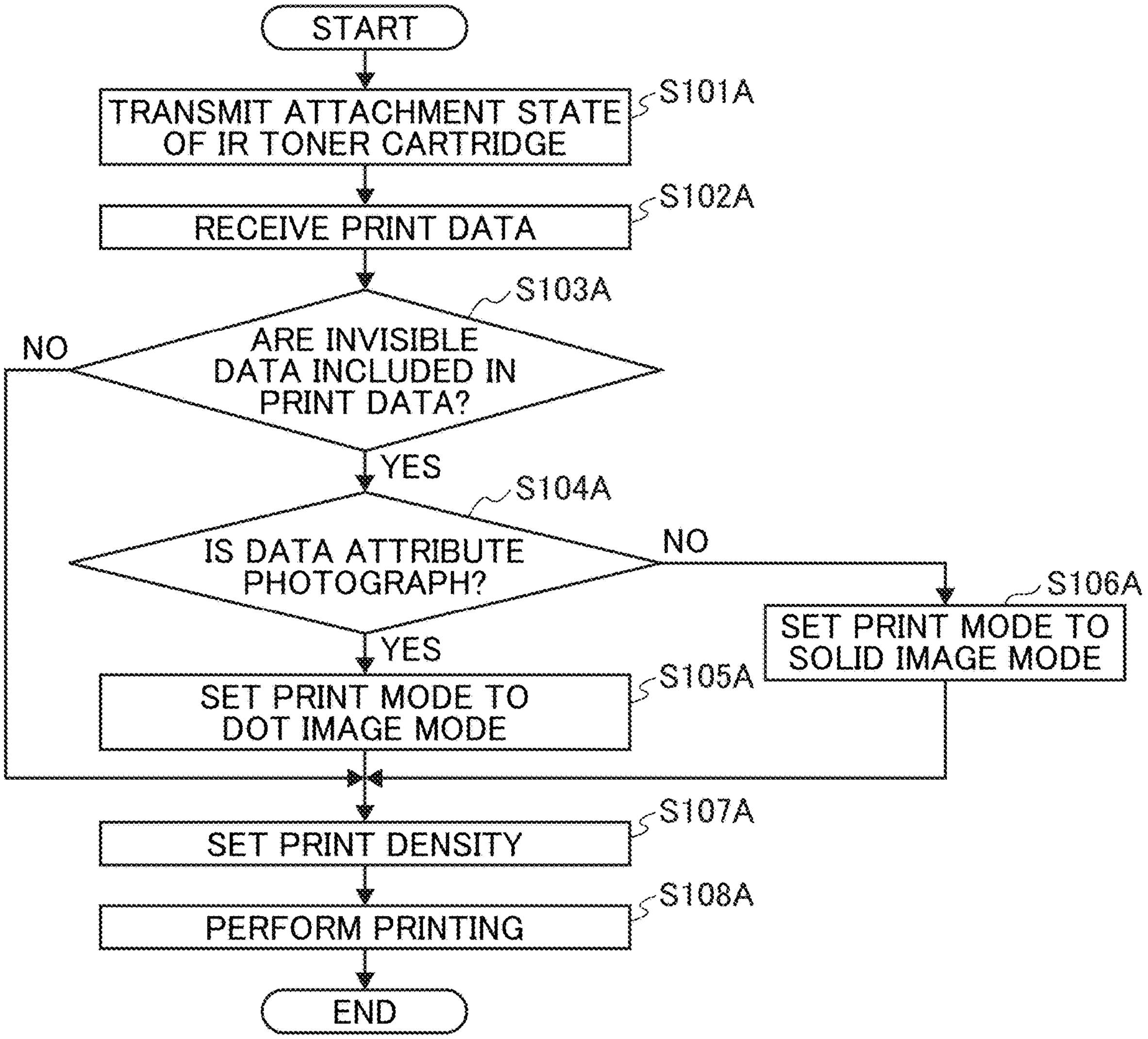
FIG. 10 is a flowchart illustrating an example of processing in the image forming apparatus according to the embodiment.

Next, processing performed by the image forming apparatus 9 will be described. FIG. 10 is a flowchart illustrating an example of processing performed by the image forming apparatus according to the embodiment.

First, in step S101A, the attachment state detection unit 91 detects the attachment state of the IR toner cartridge in the image forming apparatus 9, and outputs information on the attachment state to the information processing apparatus 5 via the attachment state transmission unit 92.

Subsequently, in step S102A, the print data receiving unit 93 receives the print data from the information processing apparatus 5, and outputs the print data to the printing condition setting unit 94.

Subsequently, in step S103A, the printing condition setting unit 94 determines whether the print data include invisible data.

If it is determined in step S103A that the print data do not include invisible data (step S103A, No), the process proceeds to step S107A. If it is determined that the print data includes invisible data (step S103A, Yes), the process proceeds to step S104A.

Subsequently, in step S104A, the print mode setting unit 941 determines whether, among the printing conditions, the data attribute is a photograph.

If it is determined in step S104A that the data attribute is a photograph (step S104A, Yes), the print mode setting unit 941 sets, as a developing bias for printing with IR toner, a developing bias determined in the process control of the image forming apparatus 9, and also sets the print mode to a dot image in step S105A.

Meanwhile, if it is determined in step S104 that the data attribute is not a photograph (step S104A, No), the print mode setting unit 941 sets, as a developing bias for printing with TR toner, a voltage approximately several volts lower than the developing bias determined in the process control of the image forming apparatus 9, and also sets the print mode to a solid image in step S106A.

Subsequently, in step S107A, the print density setting unit 942 sets developing bias and the like according to density among the printing conditions. Thereafter, the printing condition setting unit 94 outputs the print data to the printing unit 95.

Subsequently, in step S108A, the printing unit 95 prints a pattern formed by three color toners of C, M, and Y and a pattern formed by IR toner superimposed on a recording medium, based on the input print data.

In this way, the image forming apparatus 9 can print a pattern formed by three color toners of C, M, and Y and a pattern formed by IR toner superimposed on a recording medium, based on print data received from the information processing apparatus 5. More specifically, when instructed by the information processing apparatus to print with a special consumable material such as IR toner, the image forming apparatus 9 can print, with IR toner, information specified as the background pattern such as a "pattern to be printed with IR toner". Background pattern printing or the like is used for forgery prevention or copy prevention in some cases. However, there are cases where a pattern printed as a background pattern is slightly recognized when visually checked. In contrast, JR toner is substantially transparent. Thus, even when a pattern is printed on a recording medium, it is difficult to recognize the printed pattern in visual check. For this reason, printing with IR toner is more suitable to, for example, forgery prevention or original certification for labels on parts for logistics, ID cards, confidential documents, and the like.

However, printing by use of special consumable materials such as IR toner requires dedicated application software that allows printing by use of the special consumable materials. Therefore, it has not been possible to perform printing by use of special consumable materials with general applications such as office applications for performing printing by use of consumable materials of R, G, and B.

In view of the above, in this embodiment, the information processing apparatus 5 controls the display to display the background pattern setting screen that allows a user to designate a special consumable material as the color for information specified as the background pattern. When the special consumable material is designated, the information processing apparatus 5 generates print data including a print target image drawn with at least one of cyan, magenta, and yellow and information specified as the background pattern drawn with black. Then, the information processing apparatus 5 transmits the print data to the image forming apparatus 9. In this way, even when a general application is used, it is possible to designate a special consumable material to perform printing.

In addition, since there is used a background pattern setting screen included in a general printer driver, it is possible to designate a special consumable material without significantly re-designing the printer driver.

Furthermore, in the embodiment, the image forming unit for black toner is replaced with the image forming unit for a special consumable material to perform printing with IR toner. As a result, it is possible to perform printing with a special consumable material without significantly changing the configuration of the image forming unit of the image forming apparatus.

Meanwhile, in the case of applying printing with IR toner to forgery prevention or copy prevention, it is preferable that an IR toner print pattern alone can be read when read by a dedicated reading device such as an infrared camera. However, black toner absorbs infrared rays in some cases. Thus, there are cases where a pattern printed with black toner is read by a dedicated reading device. In the embodiment, the image forming apparatus is equipped with IR toner instead of black toner, and does not use black toner for printing. Therefore, it is possible to surely prevent a pattern printed with black toner from being read by a dedicated reading device. Note that a black color part printed with three color toners of cyan, magenta, and yellow is not read by a dedicated reading device.

In the embodiment, information on a pattern to be printed with IR toner can be acquired from a file. As a result, not only character information but also image information can be printed as an invisible pattern that cannot be seen. Thus, it is possible to improve the variety of invisible patterns that can be used. Moreover, as a result of printing a visible pattern, which can be seen, and an invisible pattern superimposed on the recording medium, it is possible to increase the amount of information that can be embedded per unit area. This is suitable not only for security purposes such as forgery prevention and copy prevention, but also for various purposes.

Even in the case of printing with IR toner, a printed pattern may be slightly visible when the pattern is printed on a white background part of a recording medium. In the embodiment, a visible pattern and an invisible pattern are superimposed and printed on a recording medium. As a result, it is possible to prevent a pattern printed with IR toner from being slightly visible.

In the embodiment, the file type of a file storing an invisible pattern can be selected. Thus, it is possible to change the print mode to the dot image mode or the solid image mode, or change density for printing, according to the file type. As a result, an invisible pattern such as a photograph or a bar code can be printed under more appropriate printing conditions. It is thus possible to improve the print quality of an invisible pattern.

In the case of printing in the solid image mode, the amount of IR toner adhering to a recording medium increases. Thus, a print pattern may be slightly visible in some cases. In the embodiment, in the case of printing in the solid image mode, a developing bias is set lower than the developing bias determined in the process control of the image forming apparatus. As a result, the amount of IR toner adhering to a recording medium can be reduced. It is thus possible to prevent a printed pattern from being slightly visible.

Second Embodiment

Next, an image forming system according to a second embodiment will be described. Note that description of the same components as the components in the embodiment already described will be omitted. An image forming system 10*a* according to the present embodiment includes an information processing apparatus 5*a*.

Figure 11:
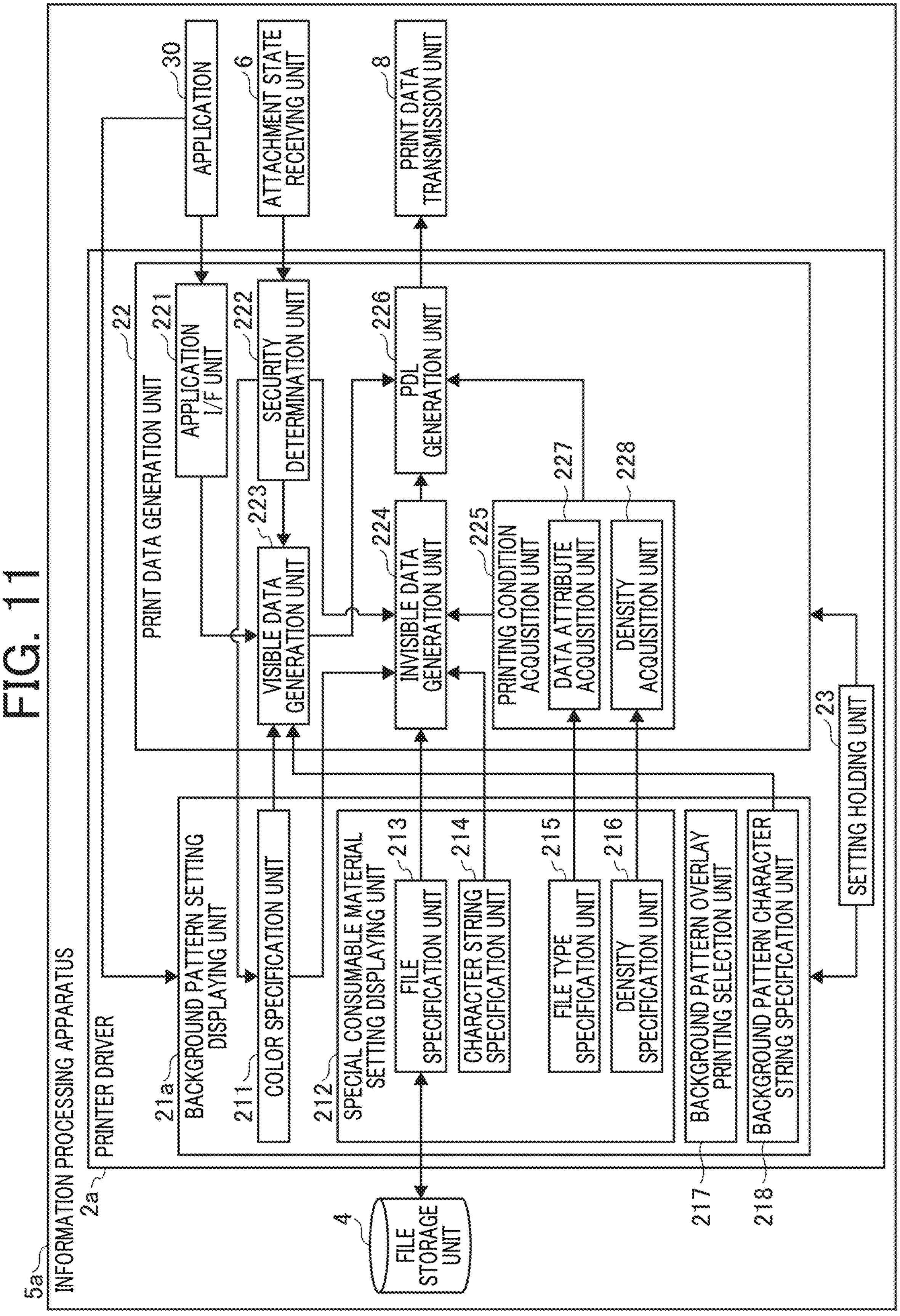
FIG. 11 is a block diagram illustrating an example of a functional configuration of an information processing apparatus according to a second embodiment.

FIG. 11 is a block diagram illustrating an example of a functional configuration of the information processing apparatus according to the present embodiment. As illustrated in FIG. 11, the information processing apparatus 5*a* includes a printer driver 2*a*. The printer driver 2*a* includes a background pattern setting displaying unit 21*a*. The background pattern setting displaying unit 21*a* includes a background pattern overlay printing selection unit 217 and a background pattern character string specification unit 218.

The background pattern overlay printing selection unit 217 controls the background pattern setting displaying unit 21*a* to display, on the display 506, the setting screen that allows a user to select whether to perform printing in which information specified as a background pattern and a background pattern included in a print target image are superimposed.

Here, the "background pattern included in a print target image" refers to a "pattern made of small dots and large dots" included in the print target image. In addition, "printing in which information specified as a background pattern and a background pattern included in a print target image are superimposed" refers to printing in which a "pattern to be printed with IR toner" and a "pattern made of small dots and large dots" included in a print target image are superimposed on a recording medium. Note that "printing in which information specified as a background pattern and a background pattern included in a print target image are superimposed" is hereinafter referred to as "background pattern overlay printing".

The background pattern character string specification unit 218 controls the display 506 to display that allows the user to specify a character string to be printed as a background pattern. The background pattern character string specification unit 218 receives a user input of a character string. The background pattern character string specification unit 218 outputs information on the specified character string to a visible data generation unit 223.

Figure 12:
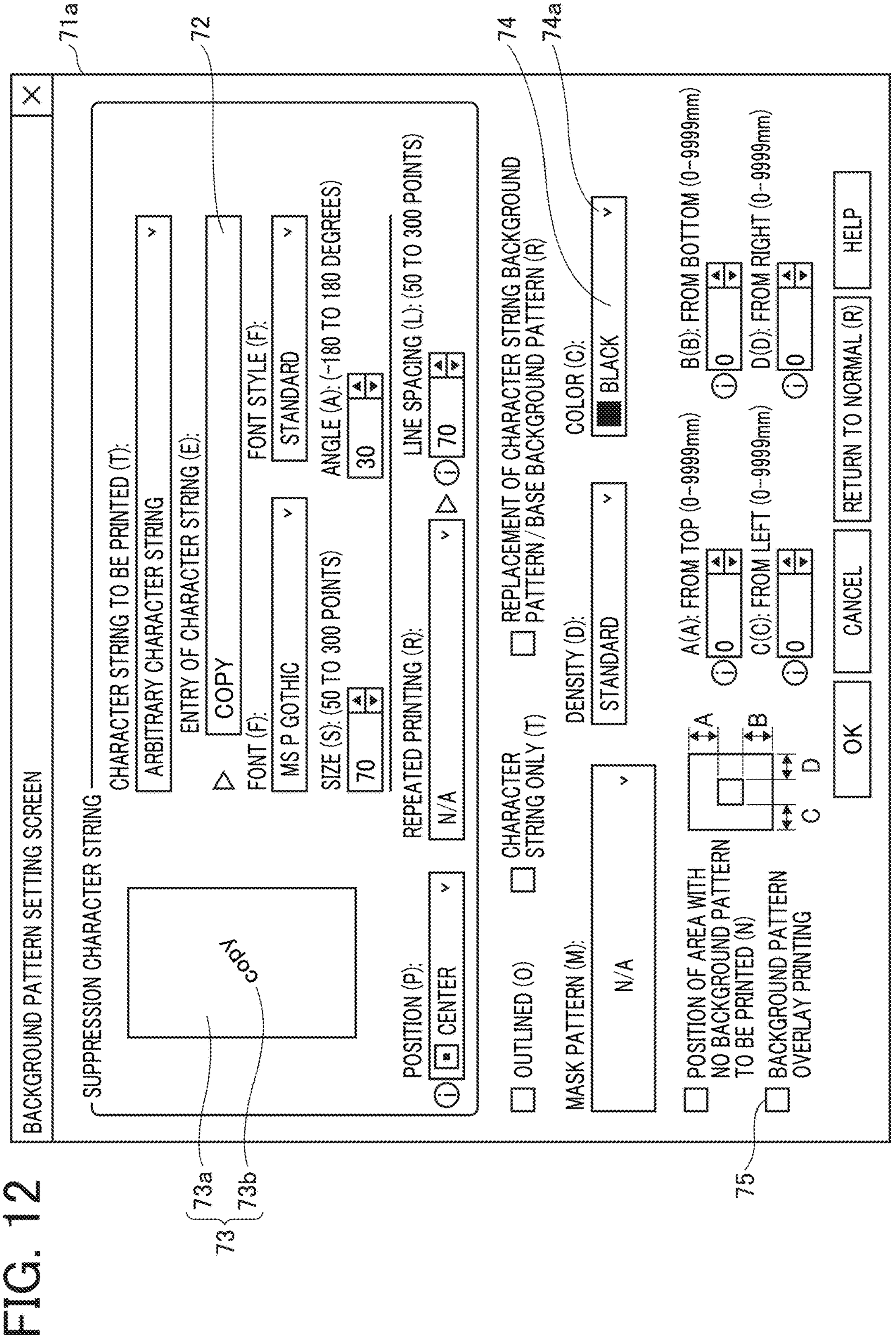
FIG. 12 is a diagram illustrating an example of a background pattern setting screen according to the second embodiment.

FIG. 12 is a diagram illustrating an example of a background pattern setting screen according to the present embodiment. This diagram illustrates an example of a background pattern setting screen to be displayed on, for example, the display 506 of FIG. 2 by the background pattern setting displaying unit 21*a* of the information processing apparatus 5*a*. A background pattern overlay check box 75 at the lower left of a background pattern setting screen 71*a* is a field displayed by the background pattern overlay printing selection unit 217 such that it is possible to choose whether to perform background pattern overlay printing.

When performing background pattern overlay printing, a user first inputs a character string to be printed as a background pattern to a background pattern edit box 72 in the first step. Next, in the second step, the user checks the background pattern overlay check box 75. Next, in the third step, the user designates "IR" in a color list box 74. Next, in the fourth step, the user configures settings for printing with IR toner on an IR toner print setting screen that is displayed when "IR" is designated in the color list box 74.

In this way, the user can cause the image forming system 10*a* to perform background pattern overlay printing. Note that the first step and the second step may be performed in reverse order as appropriate. Furthermore, the first step and the second step may be performed after performing the third step and the fourth step. Note that, when performing background pattern overlay printing, it is preferable that a background pattern included in a print target image be printed with toner other than black toner, that is, cyan toner, magenta toner, or yellow toner. Therefore, it is possible to adopt a configuration in which "black" cannot be designated in the color list box 74 when the background pattern overlay check box 75 is checked. Alternatively, it is also possible to adopt a configuration in which "black" can be designated. In such a case, black color is generated by use of toners of three colors of cyan, magenta, and yellow to print a background pattern with the black color when black is designated.

Figure 13A:
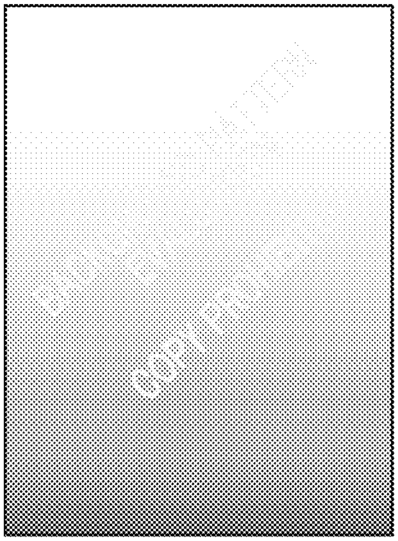
FIGS. 13A to 13C are diagrams describing examples of results of printing by an image forming system according to the second embodiment.
Figure 13B:
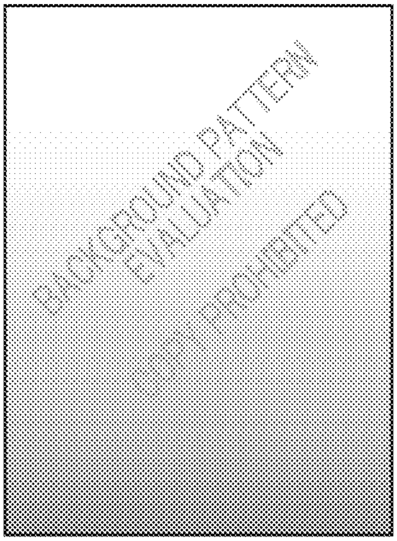
Figure 13C:
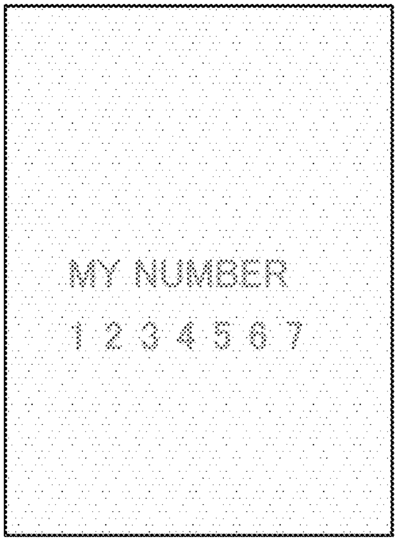

FIGS. 13A to 13C are diagrams describing examples of results of printing by the image forming system according to the present embodiment. FIG. 13A is a diagram illustrating a recording medium after printing. FIG. 13B is a diagram illustrating a recording medium as a copy of the recording medium of FIG. 13A. FIG. 13C is a diagram illustrating an image of the recording medium of FIG. 13A read by an infrared camera.

In FIG. 13A, the characters "BACKGROUND PATTERN EVALUATION" and "COPY PROHIBITED" printed as a background pattern are slightly recognized when visually checked, although the characters are difficult to see. In FIG. 13B, the characters "BACKGROUND PATTERN EVALU- ATION" and "COPY PROHIBITED" emerge to be visible as a result of copying the recording medium of FIG. 13A. In FIG. 13C, the characters "MY NUMBER" and "1234567" printed on the recording medium with IR toner are read by the infrared camera. The characters "MY NUMBER" and "1234567" are also printed with IR toner on the recording medium of FIG. 13A. However, FIG. 13A illustrates an image read with visible light, and these characters are thus not visible at all.

As described above, the information processing apparatus according to the present embodiment includes the background pattern overlay printing selection unit 217. The background pattern overlay printing selection unit 217 provides display on a setting screen displayed by the background pattern setting displaying unit 21*a* such that it is possible to choose whether to perform printing in which information specified for a background pattern and a background pattern included in a print target image are superimposed. As a result, a background pattern and a pattern formed by IR toner can be superimposed and printed on a recording medium.

The advantageous effects other than the effects described above are the same as the effects described in the first embodiment.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An information processing apparatus, comprising:

circuitry configured to control a display to display a setting screen for a background pattern that allows a user to designate a special consumable material as a color to be used for information specified as the background pattern;

generate print data using the designated special consumable material; and transmit the print data to an image forming apparatus, wherein the circuitry is further configured to display the setting screen that allows the user to designate any one of a color other than the special consumable material and the special consumable material, as the color to be used for the information specified as the background pattern, and when the special consumable material is designated, display a setting item of a printing condition different from a setting item of a printing condition provided when the color other than the special consumable material is designated.

2. The information processing apparatus according to claim 1, wherein when the special consumable material is designated, the circuitry is further configured to generate the print data including a print target image drawn with at least one of cyan, magenta, and yellow and the information specified as the background pattern drawn with black.

3. The information processing apparatus according to claim 1, wherein the circuitry is further configured to display the setting screen that allows the user to specify a file containing the information specified as the background pattern as the setting item when the special consumable material is designated.

4. The information processing apparatus according to claim 3, wherein the circuitry is further configured to display the setting screen that allows the user to specify the file containing the information specified as the background pattern, wherein the information specified as the background pattern includes at least one of character information and image information.

5. The information processing apparatus according to claim 3, wherein the circuitry is further configured to display the setting screen that allows the user to specify a type of the file as the setting item.

6. The information processing apparatus according to claim 1, wherein the circuitry is further configured to display the setting screen that allows the user to specify a density for the information specified as the background pattern as the setting item.

7. The information processing apparatus according to claim 1, wherein the circuitry is further configured to display the setting screen that allows the user to select whether to perform printing in which the information specified as the background pattern and a background pattern included in the print target image are superimposed.

8. An image forming system comprising:

the information processing apparatus according to claim 1; and an image forming apparatus communicably connected to the information processing apparatus, including an image forming device configured to print information specified as the background pattern with the special consumable material in response to an instruction to print the special consumable material that is received from the information processing apparatus.

9. The image forming system according to claim 8, wherein the image forming apparatus further includes processing circuitry configured to set a printing condition according to at least one of a data attribute and a density of the information specified as the background pattern.

10. The image forming system according to claim 8, wherein the image forming apparatus further includes processing circuitry configured to detect an attachment state of a container of the special consumable material.

11. The image forming system according to claim 10, wherein the processing circuitry of the image forming apparatus is further configured to transmit information on the attachment state to the information processing apparatus, and the circuitry of the information processing apparatus is further configured to determine whether the image forming apparatus can perform printing with the special consumable material, according to the attachment state.

12. The image forming system according to claim 8, wherein the image forming device is configured to print the information specified as the background pattern with the special consumable material, wherein the special consumable material includes invisible toner.

13. The image forming system according to claim 12, wherein the image forming device is configured to print the information specified as the background pattern with the special consumable material, wherein the invisible toner includes infrared (IR) toner.

14. The information processing apparatus of claim 1, wherein the circuitry is further configured to control the display to display the setting screen, which allows a user to input a character string to be printed as the background pattern.

15. An information processing method, comprising:

displaying, on a display, a setting screen for a background pattern that allows a user to designate a special consumable material as a color for information specified as the background pattern;

generating print data using the designated special consumable material; and transmitting the print data to an image forming apparatus, wherein the method further includes displaying the setting screen that allows the user to designate any one of a color other than the special consumable material and the special consumable material, as the color to be used for the information specified as the background pattern, and when the special consumable material is designated, displaying a setting item of a printing condition different from a setting item of a printing condition provided when the color other than the special consumable material is designated.

16. A non-transitory recording medium storing a program which, when executed by processing circuitry, causes the processing circuitry to perform an information processing method comprising:

displaying, on a display, a setting screen for a background pattern that allows a user to designate a special consumable material as a color for information specified as the background pattern;

generating print data using the designated special consumable material; and transmitting the print data to an image forming apparatus, wherein the method further includes displaying the setting screen that allows the user to designate any one of a color other than the special consumable material and the special consumable material, as the color to be used for the information specified as the background pattern, and when the special consumable material is designated, displaying a setting item of a printing condition different from a setting item of a printing condition provided when the color other than the special consumable material is designated.

* * * * *